United States Patent Office 3,769,368
Patented Oct. 30, 1973

3,769,368
GRAFTED COPOLYMER WITH TWO SEQUENCES OF RECURRING UNITS AND METHODS OF PRODUCING SAME
Jean Peyrot, Le Havre, France, assignor to Compagnie Francaise de Raffinage, Paris, France
No Drawing. Filed Dec. 20, 1971, Ser. No. 210,162
Claims priority, application France, Dec. 21, 1970, 7045985
Int. Cl. C08f 15/00
U.S. Cl. 260—877           11 Claims

ABSTRACT OF THE DISCLOSURE

A copolymer with two sequences of recurring units is produced by first forming a homopolymer with a benzene ring at one of its ends, then effecting chloromethylation of the benzene ring and finally effecting cationic grafting of a monomer onto the chloromethyl group of the homopolymer.

SUMMARY OF THE INVENTION

The present invention relates to sequence copolymers and especially to copolymers comprising very few sequences.

In the following description, the term "sequence" will denote that portion of the copolymer molecule wherein the same monomer is present in a recurring unit.

The advantage of copolymers having few sequences is that these latter are individualized and certain of their own properties are repeated in the copolymer properties.

Certain homopolymers are known to be incompatible, that is, they cannot be closely mixed. The production of a sequenced copolymer, exhibiting very few long sequences, from monomers whose homopolymers are incompatible is one means for making the homopolymers compatible.

An object of the present invention is to produce a sequenced copolymer having only two sequences.

Such copolymers have already been synthesized by anionic polymerization, effected successively on different monomers.

This method consists, in a first stage, of contacting an organometallic compound such as butyl lithium with a monomer M capable of anionic polymerizing; then when the required molecular weight has been obtained, of contacting the homopolymer with another monomer, N.

The reactions can be analytically represented as follows:

BuLi+nM→Bu M—M . . . M$^{(-)}$—Li$^{(+)}$

Bu M—M . . . —M$^{(-)}$—Li$^{(+)}$n'N→
    Bu—M—M— . . . —M—N—N . . . N$^{(-)}$Li$^{(+)}$

Nevertheless, this method can be applied only to monomers which polymerize anionically and this is very delicate to initiate, since it requires a perfectly pure reactive medium. This condition is difficult to achieve when the polymerization apparatus is to be of industrial size.

The method of the invention offers the advantage of being easier to initiate.

The present invention is directed to a process for obtaining a sequenced copolymer having two sequences, said process comprising the following three stages:
 (a) Synthesis of a homopolymer whose molecule comprises a benzene ring at one end;
 (b) Chloromethylation of the end benzene ring of the homopolymer; and
 (c) Cationic grafting of the resulting chloromethylated molecule at the chloromethyl groups.

The presence of a benzene ring at one end of a homopolymer molecule can be obtained in various ways. For example, the aromatic ring can issue from the catalyst when the homopolymer is produced by means of radicals or anions, or from the cocatalyst when the homopolymer is obtained cationically or from the telogen when the homopolymer is obtained through telomerization.

These various methods, which can be used as the first phase of the process according to the invention, for the synthesis of the homopolymer whose molecule comprises a benzene ring at one of its ends, will be described hereunder in fuller detail.

The synthesis by use of a radical can be shown as follows:

A peroxide capable of producing radicals e.g. by heating and comprising benzene rings in its molecule is contacted with a monomer A capable of polymerizing radically. As examples of these peroxides are the benzoyl and dicumyl peroxides and an example of monomer A is ethylene.

In the case of polymerization of monomer A in the presence of benzoyl peroxide, the reactions are as follows:

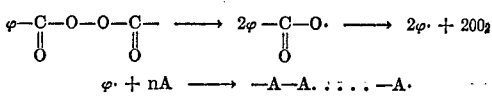

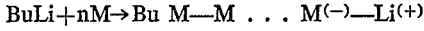

where φ· represents phenyl.

The synthesis by anionic means can be shown as follows:

An organometallic compound containing a benzene ring such as phenyl lithium is contacted with a monomer B capable of polymerizing anionically. As examples of monomer B, are conjugate dienes. In the case of phenyllithium and a monomer B, the reaction is as follows:

Li+nB→φ—B—B— . . . B$^{(-)}$Li$^{(+)}$

A particular case of anionic synthesis is synthesis by telomerization; this can be shown as follows:

A telogen substance is contacted with a monomer D called a taxogen. Thus, for example, when the telomerization reaction is conducted in the presence of a butyl lithium diamine, the reactions are as follows:

BuLi-amine+φ—CH$_3$→Bu+φ—CH$_2$—Li-amine

φ—CH$_2$—Li-amine=nD→φ—CH$_2$
                    —D—D— . . . —D—Li-amine

φ—CH$_2$—D—D . . . D—Li-amine+Bu→
            φ—CH$_2$—D—D— . . . —D+Bu—Li-amine where
—CH$_3$ is the telogen substance,
D is ethylene,
Li-amine represents a lithium-diamine group.

Synthesis by cationic means can be shown in the following manner:

A complex is formed by reaction of a cationic catalyst and a cocatalyst containing a benzene ring. This complex is contacted with a monomer C capable of polymerizing cationically. As an example of a cationic catalyst is diethylaluminum chloride (AlEtCl), and in general, Friedel-Crafts catalysts; as an example of the cocatalyst, benzoyl chloride can be mentioned; as examples of monomer C are isobutylene and styrene. Where the catalyst and cocatalyst are respectively AlEt$_2$Cl and φ—CH$_2$Cl the reaction can be represented as follows:

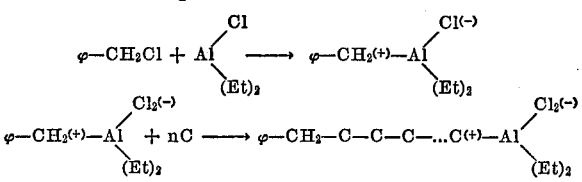

wherein (Et) represents the ethyl residue.

The four methods of synthesis just described each provide a homopolymer with a benzene ring at one of the ends of the molecule. The method to be selected depends on the nature of the monomer (A, B, C or D).

The second stage of the process according to the invention consists in effecting a chloromethylation reaction at the end benzene ring. This reaction is effected in a known manner, for example in solution in a non-aromatic solvent by reaction with chloromethylmethyl ether in the presence of stannic chloride. On completion of the second stage, there is obtained a polymer having the following formula:

$$A—A \ldots —A—A—\varphi—CH_2Cl$$

A can be substituted by B, C or D in this formula.

The third stage yields the sequenced copolymer.

The polymer from the second stage is contacted with a cationic catalyst such as $AlEt_2Cl$ or a Friedel-Crafts catalyst. The complex so formed acts as a substrate for the cationic attachment by grafting of a monomer E. The reactions can be represented in the following manner:

$$A—A— \ldots —A—A—\varphi—CH_2Cl + AlEt_2Cl \longrightarrow$$

$$A—A \ldots ;—A—A—\varphi—CH_2^{(+)}—Al\!\!\begin{matrix}Cl_2^{(-)}\\ \diagup \\ \diagdown \\ (Et)_2\end{matrix}$$

$$A—A ;;.A—A—\varphi—CH_2^{(+)}—Al\!\!\begin{matrix}Cl_2 \\ \diagup \\ \diagdown \\ (Et)_2\end{matrix} + nE \longrightarrow$$

$$A—A ;;;A—A—\varphi—CH_2—E—E \ldots E^{(+)}—Al\!\!\begin{matrix}Cl_2^{(-)}\\ \diagup \\ \diagdown \\ (Et)_2\end{matrix}$$

The catalytic residues are removed by washing. It can be observed that the copolymer complying with the invention has the following formula:

$$A—A \ldots A—\varphi—CH_2E—E \ldots E$$

wherein A can be replaced by B, C or D. This polymer contains $—\varphi—CH_2—$ between the first sequence A (B, C or D) and the second sequence E.

Certain groups are known to form complexes with the cationic polymerization catalyst and consequently act as an inhibitor. The third stage of the process can therefore be carried into effect only in the absence of such groups in the macromolecules obtained from the first stage. Those groups are, by way of examples:

—CO, —COOR, —NH$_2$, SH and —NO$_2$

DESCRIPTION OF PREFERRED EMBODIMENTS

The following examples, not limitative in character, illustrate the details of the invention.

Example 1

(A) Synthesis of polyisobutylene (PISB) having a benzene ring at the end of the chain.—In a 2-liter reactor kept at −78° C. and exposed to a nitrogenous atmosphere, 150 cc. of heptane, 40 cc. of isobutylene and 1 cc. benzoyl chloride are introduced with agitation and then 1 cc. of $AlEt_2Cl$ catalyst in 50 cc. heptane is introduced dropwise. The reaction time is 2 hours. The polymer is then precipitated by adding methanol.

The catalyst is destroyed during the precipitation; the catalyst residues present in the polymer are eliminated as follows: after decantation, the polymer is recuperated and dissolved in heptane. The solution is filtered and washed in water. An organic phase is separated from the aqueous phase by decantation and the polymer is precipitated with methanol and dried under vacuum at 80° C.

The molecular weight ($\overline{M}v$) of the PISB obtained is determined by viscosity measurement at 25° C. in cyclohexane and is equal to 8000.

In another test conducted under similar conditions but using only 0.25 cc. of catalyst, the molecular weight ($\overline{M}v$) of the PISB was 230,000.

(B) Chloromethylation of polyisobutylene (PISB).—15 g. of PISB of molecular weight $\overline{M}v=230,000$ are dissolved in 160 cc. of heptane in a 500 cc. round-bottomed flask. 120 cc. of chloromethyl-methyl-ether is added and the temperature raised to 60° C. At the temperature, a catalyst composed of 3 cc. of $SnCl_4$ in 30 cc. of chloromethylmethylether is introduced dropwise. After 1 hour the polymer is precipitated in methanol and purified as in phase (A) above.

Analysis of the product shows it to cantain 0.16% chlorine by weight.

(C) Cationic grafting.—2 g. of chloromethylated polymer are dissolved in 150 cc. of heptane in a 2-liter reactor at room temperature. The solution is cooled and kept at −20° C. throughout the reaction.

30 cc. of styrene and 1.5 cc. $AlEt_2Cl$ dissolved in 50 cc. heptane are added under agitation. After 2 hours the reaction is arrested by methanol and the copolymer is precipitated. It is refined as in step (A), using, however, benzene as the solvent instead of heptane. The copolymer is then precipitated and vacuum-dried at 80° C.

The weight increase measured in proportion to the chloromethylated PISB is 89%.

In a second test, conducted in similar circumstances but at a temperature of 0° C., the weight increase is 96%.

(D) Isolation of the sequenced copolymer.—The sequenced copolymer is precipitated with polystyrene (PST) and possibly with PISB; hexane is known to be a solvent for PISB and cold cyclohexane (temperature less than 30° C.) is a solvent for the grafted isobutylene-styrene copolymer (PISB-PST) and low molecular-weight polystyrene PST.

It is known that if a mixture of PISB, PST and grafted isobutylene and styrene copolymer is sequentially subjected to two successive extractions performed at room temperature—a first extraction with hexane, then a second extraction with cyclohexane on the portion insoluble in hexane, three fractions of different compositions are obtained, these being as follows:

$F_1$—constituents soluble in hexane (PISB)
$F_2$—constitutents insoluble in hexane and soluble in cyclohexane (isobutylene-styrene grafted copolymer and PST of low molecular weight)
$F_3$—constituents insoluble in both solvents (PST of high molecular weight).

Ultraviolet and infrared radiation spectroscopic analysis of the fractions obtained after the two extraction mentioned above, effected on the product from phase C of cationic grafting leads to the results shown in Table 1:

TABLE 1

| Grafting conditions (Stage C) | $F_1$ Percent of this fraction | $F_1$ Composition (percent weight) PISB | $F_1$ Composition (percent weight) PST | $F_2$ Percent of this fraction | $F_2$ Composition (percent weight) PISB | $F_2$ Composition (percent weight) PST | $F_3$, percent of this fraction |
|---|---|---|---|---|---|---|---|
| Test at −20° C | 65 | 76.6 | 23.4 | 32 | 2.2 | 97.8 | 3 |
| Test at 0° C | 59 | 82 | 18 | 35 | 5 | 95 | 6 |

This confirms that fraction $F_1$ contains some PST and that fraction $F_2$ contains some PISB.

The presence of PISB in $F_2$ indicates the presence of sequenced copolymer in that fraction; in fact, in the absence of sequenced copolymer, the entire amount of PISB would be in $F_1$. The presence of PST in $F_1$ is due to the dissolution of sequenced copolymer comprising a small sequence of PST.

The presence of sequenced polymer in $F_1$ is confirmed by the following experiment:

Films 0.4 mm. thick are prepared from a mixture of chloromethylated polyisobutylene and polystyrene (in the ratio of 80%–20% by weight); the molecular weights of polystyrene $\overline{Mw}$ and $\overline{Mn}$, determined by gel chromatography at 130° C. in trichlorobenzene being respectively $\overline{Mw}$=26,500 and $\overline{Mn}$=10,300. Further films of equal thickness are prepared from the polymer present in the fraction $F_1$. It is found that only the films prepared from the polymer present in $F_1$ are clear, transparent and homogeneous, while the other films are opaque, turbid and heterogeneous.

Example 2

(A) Synthesis of an alkylbenzene by telomerization.—Ethylene is telomerized in the presence of toluene and butyl lithium diamine.

Three tests are performed in this way leading to three alkylbenzenes, whose molecular weights determined by gel chromatography at 130° C. in trichlorobenzene are as follows (Table 2).

TABLE 2

|  | $\overline{Mw}$ | $\overline{Mn}$ |
|---|---|---|
| Compositions: | | |
| 1 | 1,200,000 | 10,000 |
| 2 | 1,800 | 1,000 |
| 3 | 5,000 | 2,300 |

(B) Chloromethylation of the alkylbenzene.—10 grams of alkylbenzene are dispersed in 160 cc. of heptane and 120 cc. of chloromethyl/methyl ether; the solution is then treated as in the process described in Example 1 (B).

The alkylbenzenes obtained in (A) are thus treated in the course of three successive tests.

Three chloromethylated alkylbenzenes are obtained, whose chlorine content after purification through three successive washings with the following mixtures: dioxane and water; hydrochloric acid, dioxane and water; then methanol only, are shown in Table 3.

TABLE 3

| Compositions: | Percent by weight |
|---|---|
| 1 | 0.33 |
| 2 | 7 |
| 3 | 5.7 |

(C) Cationic grafting.—Styrene was grafted onto the chloromethylated alkylbenzenes 1 and 2; isobutylene was grafted onto chloromethylated alkylbenzene 3. The graftings were performed in accordance with the process described in phase (C) of Example 1, at −20° C., using 2 g. of chloromethylated alkylbenzene and respectively 200 cc. heptane and 30 cc. styrene, and 30 cc. isobutylene (this last volume being measured in solid carbon dioxide).

The results appear in Table 4 hereunder.

TABLE 4

| | Chloromethylated alkylbenzene | | | After cationic grafting of— | | |
| | | | | Styrene | | Isobutylene |
| | 1 | 2 | 3 | 1' | 2' | 3' |
|---|---|---|---|---|---|---|
| Weight (grams) | 2 | 2 | 2 | 2.5 | 26 | 15 |
| Solubility in benzene, percent | 0 | | | | 20 | |
| Solubility in cyclohexane, percent | | 0 | 0 | | 97 | |
| Solubility in hexane, percent | | | | | | 86.2 |

This shows that product 1' is composed of 20% of benzene-soluble PST and 80% of a mixture of alkylbenzene and alkylbenzene-PST sequenced copolymer (insoluble in benzene). Infrared radiation analysis makes it possible to determine that the PST represents 5% by weight of the benzene-insoluble fraction; this 5% of PST is included in the sequence copolymer molecules.

Product 2' dissolves in cyclohexane in a 97% proportion; this fraction is composed of PST and the sequenced copolymer. As a matter of fact, infrared analysis discloses that 5% of the cyclohexane-soluble fraction is composed of the alkylbenzene.

Tests 1' and 2' demonstrate the alkylbenzene-PST sequenced copolymer. It is collected with the PST and the ungrafted alkylbenzene.

Test 3' shows for the alkylbenzene-polyisobutylene sequenced copolymer. The hexane-soluble fraction (86.2%) of the product of reaction 3' is PISB; the insoluble fraction (13.8%) can be fractionated into two portions:

One portion (3.5%) which quickly decants, is composed of the alkylbenzene which did not graft;

A second portion (10.3%) which remains in suspension in the hexane and is recovered by centrifuging is composed of the sequenced copolymer; its composition is 60% alkylbenzene and 40% PISB.

What is claimed is:

1. A process for producing a copolymer having two sequences, from a first monomer and a second monomer different from said first monomer, said process comprising the successive steps of
    (a) forming a homopolymer from said first monomer, said homopolymer having a benzene ring at one of its ends and being free from groups capable of reacting with the cationic polymerization catalyst and thus acting as an inhibitor;
    (b) chloromethylating the end benzene ring of said homopolymer; and
    (c) effecting cationic grafting, on the resulting chloromethylated molecule at the chloromethyl group, of the second sequence of said second monomer.

2. A process as claimed in claim 1, wherein the formation of the homopolymer is effected by use of a peroxidic free radical initiator, utilizing a substance generating phenyl or substituted phenyl radicals.

3. A process as claimed in claim 1, wherein the formation of the homopolymer is effected anionically, using phenyl lithium as an initiator.

4. A process as claimed in claim 1, wherein the formation of the homopolymer is effected by telomerization with toluene as a telogen substance.

5. A process as claimed in claim 1, wherein the formation of the homopolymer is effected cationically, using a Friedel-Crafts type catalyst and a cocatalyst containing one benzene ring.

6. A process as claimed in claim 5, wherein the catalyst is diethylene aluminum chloride and the cocatalyst is $C_6H_5$—$CH_2Cl$.

7. A process as claimed in claim 6, wherein the monomer subjected to polymerization is isobutylene.

8. A process as claimed in claim 4, wherein telomerization is effected on ethylene as the taxogen substance.

9. A process as claimed in claim 1, wherein the chloromethylated molecule is grafted with a monomer selected from the group consisting of isobutylene and styrene.

10. A sequenced copolymer having two sequences prepared by the process in claim 1.

11. A copolymer as claimed in claim 10 wherein the two sequences are selected from the group consisting of polystyrene, an alkylbenzene and polyisobutylene.

References Cited

UNITED STATES PATENTS 3,652,724   3/1972   Shimomura et al.  __ 260—878 B

JOSEPH L. SCHOFER, Primary Examiner

A. HOLLER, Assistant Examiner

U.S. Cl. X.R.

260—878 B